(12) United States Patent
O'Neill

(10) Patent No.: US 9,248,537 B2
(45) Date of Patent: Feb. 2, 2016

(54) QUICK CHANGE FASTENER

(75) Inventor: John J. O'Neill, Wichita, KS (US)

(73) Assignee: OMNI AEROSPACE, INC., Wichita, KS (US)

( * ) Notice: Subject to any disclaimer, the term of this patent is extended or adjusted under 35 U.S.C. 154(b) by 515 days.

(21) Appl. No.: 13/621,088

(22) Filed: Sep. 15, 2012

(65) Prior Publication Data

US 2014/0079475 A1    Mar. 20, 2014

(51) Int. Cl.

| F16B 21/14 | (2006.01) |
|---|---|
| B23Q 3/10 | (2006.01) |
| F16B 21/16 | (2006.01) |
| F16B 5/06 | (2006.01) |
| F16B 37/04 | (2006.01) |

(52) U.S. Cl.
CPC .............. *B23Q 3/103* (2013.01); *F16B 21/165* (2013.01); *F16B 5/0642* (2013.01); *F16B 37/046* (2013.01); *Y10T 403/56* (2015.01); *Y10T 403/592* (2015.01)

(58) Field of Classification Search
None
See application file for complete search history.

(56) References Cited

U.S. PATENT DOCUMENTS

| 2,089,166 | A | | 8/1937 | Reichhardt |
|---|---|---|---|---|
| 2,992,685 | A | | 7/1961 | Madsen |
| 3,578,799 | A | | 5/1971 | Davis |
| 3,683,988 | A | | 8/1972 | Carter et al. |
| 4,643,472 | A | * | 2/1987 | Schukei et al. .................. 294/94 |
| 4,655,657 | A | * | 4/1987 | Duran ............................ 411/348 |
| 5,452,979 | A | * | 9/1995 | Cosenza ......................... 411/348 |
| 6,095,736 | A | | 8/2000 | Miller et al. |
| 6,152,645 | A | | 11/2000 | Sanford |
| 6,296,431 | B1 | | 10/2001 | Miller |
| 6,755,103 | B2 | | 6/2004 | Morehead |
| D496,852 | S | | 10/2004 | Gass et al. |
| 6,997,658 | B2 | | 2/2006 | Fly |
| 7,051,635 | B2 | | 5/2006 | Morehead |
| 7,762,739 | B2 | * | 7/2010 | Blanchard .................. 403/322.2 |
| 7,914,225 | B2 | | 3/2011 | Hageman |

(Continued)

FOREIGN PATENT DOCUMENTS

| EP | 1334783 B1 | 11/2006 |
|---|---|---|
| WO | 02/061291 A1 | 8/2002 |

(Continued)

OTHER PUBLICATIONS

Mitee-Bite Products LLC, "Providing New Innovative Solutions", handout at the IMTS Trade Show in Chicago, Illinois, Sep. 10-15, 2012.

(Continued)

*Primary Examiner* — Victor MacArthur
(74) *Attorney, Agent, or Firm* — Thomas E. Lees, LLC

(57) ABSTRACT

A fastener comprises a housing, a pintle and a locking feature. The housing includes a shaft, a central bore that extends axially at least partially through the housing and a ball lock aperture extending from the bore radially out through the shaft. The pintle is positioned within the bore and includes an actuation end and a rod that extends axially from the actuation end. The rod includes a ball transitioning surface and a ball locking surface. The pintle is moveable axially within the bore between a designated lock position where the ball locking surface of the pintle is aligned in register with each ball lock aperture urging a locking ball through the ball lock aperture, and a designated unlocked position where the ball lock surface of the pintle is moved axially away from each ball lock aperture allowing the locking ball to recess into the housing.

12 Claims, 12 Drawing Sheets

(56) References Cited

U.S. PATENT DOCUMENTS

| | | |
|---|---|---|
| 7,938,607 B2 | 5/2011 | Wang |
| 8,016,529 B2 | 9/2011 | Robinson et al. |
| 8,061,947 B2 | 11/2011 | Van Tiem et al. |
| 8,113,755 B2 | 2/2012 | Wang |
| 8,152,151 B2 | 4/2012 | Sandmeier |
| 2005/0084361 A1 | 4/2005 | Fly |
| 2007/0003391 A1 | 1/2007 | Stapulionis et al. |
| 2009/0051094 A1 | 2/2009 | Sandmeier |
| 2009/0179368 A1 | 7/2009 | Haimer |
| 2009/0232616 A1 | 9/2009 | Sekreta |
| 2010/0054854 A1* | 3/2010 | Wang ............... 403/322.2 |
| 2010/0316439 A1 | 12/2010 | Schron, Sr. et al. |
| 2011/0008128 A1 | 1/2011 | Soltis et al. |
| 2012/0051832 A1* | 3/2012 | Krause et al. ............ 403/27 |
| 2012/0051835 A1* | 3/2012 | Taylor et al. ........ 403/322.2 |
| 2012/0076578 A1 | 3/2012 | Schron, Sr. et al. |
| 2012/0085875 A1 | 4/2012 | Hoyt et al. |
| 2012/0210542 A1* | 8/2012 | Yang ..................... 24/369 |

FOREIGN PATENT DOCUMENTS

| | | |
|---|---|---|
| WO | 2005/062856 A2 | 7/2005 |
| WO | 2005/107619 A2 | 11/2005 |
| WO | 2012/033803 A1 | 3/2012 |

OTHER PUBLICATIONS

Canadianmanufacturing.com; CMW Staff, "IMTS 2012 Preview: Mitee-Bite Products LLC introduce two new working products", Aug. 17, 2012, Business Information Group, downloaded at http://www.canadianmanufacturing.com/metalworking/machining/imts-2012-preview-mitee-bite-products-llc-introduce-two-new-workholding-products-74576.

* cited by examiner

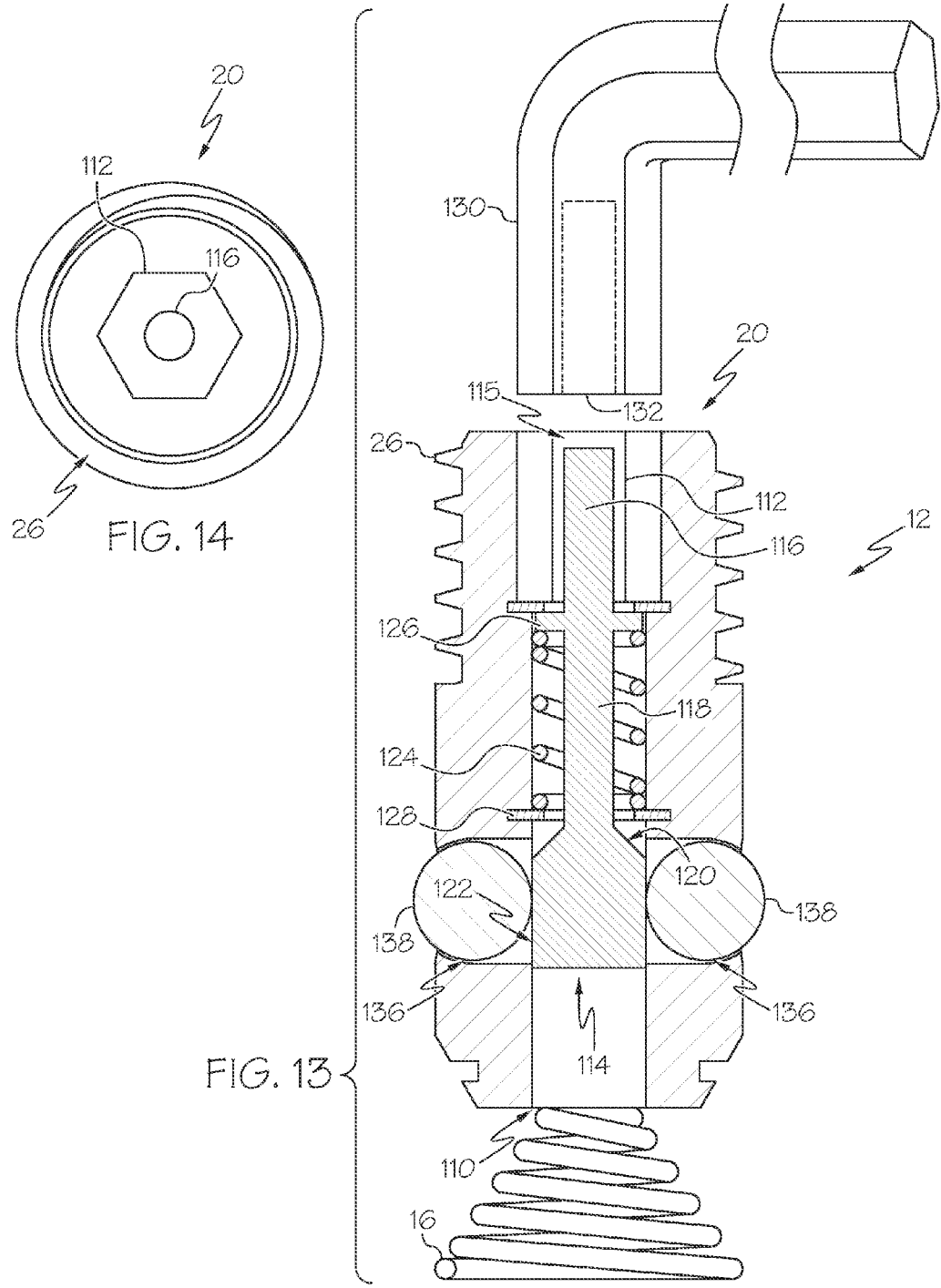

QUICK CHANGE FASTENER

BACKGROUND

The present invention relates to a device for quickly and temporarily securing a work piece and/or a work piece holder to another work surface for use in machining operations.

In the manufacturing industry, it is often necessary to temporarily locate a work piece or work fixture at a specific position on a work surface in order to machine a mechanical part from the work piece or to perform some other industrial process on the work piece. For instance, a work piece may be machined by removing material from the work piece using a mill, router, lathe, water jet cutter, electrical discharge machine, saw, grinder or other material removing equipment.

A fixture is a work holder that is typically used to hold, support and locate the work piece during such machining operations. The fixture is further used to reference the cutting tool of a corresponding machine, e.g., to temporarily secure the work piece in a desired position relative to a cutting tool during a machining operation or to otherwise position the work piece during an industrial process. In this regard, a fixture typically includes an edge finder, center finder, or gage blocks to repeatedly and consistently position a work piece relative to the cutting tool of a corresponding machine. As such, a fixture can be used in almost any operation that requires a precise relationship in the positioning of a tool relative to a work piece.

A permanent fixture typically has a custom configuration, which is built to fit a particular part or shape. This type of fixture is often well suited for high-volume production. Alternatively, a fixture may be provided for general-purpose use. For example, in certain instances, the shape of the work piece and the machining to be performed allow for the use of a general-purpose fixture that is adaptable to different machines and/or different parts. The general-purpose fixture may be well suited for machining parts in low volume runs or for machining parts that have few critical dimensions.

Regardless of the type of fixture, the work piece is typically temporarily attached to the fixture using one or more bolts, which allows the work piece to be removed and replaced by the next part to be machined.

BRIEF SUMMARY

According to aspects of the present invention, a fastener for temporarily securing objects, e.g., a work piece to a work holder, comprises a housing, a pintle and a locking feature. The housing includes a first end face, a second end face, a shaft extending between the first end face and the second end face, a central bore that extends axially at least partially through the housing from the first end face and at least one ball lock aperture extending from the bore radially out through the shaft of the housing. The pintle is positioned within the bore and includes an actuation end and a rod that extends axially through the bore from the actuation end. The rod of the pintle includes a ball transitioning surface and a ball locking surface adjacent to the ball transitioning surface. In this regard, the pintle is moveable axially within the bore of the housing such that in a designated lock position, the ball locking surface of the pintle is aligned in register with each ball lock aperture and in a designated unlocked position the ball lock surface of the pintle is moved axially away from each ball lock aperture. The locking feature includes a locking ball for each ball lock aperture, each locking ball having a diameter larger than the diameter of the associated ball lock aperture.

According to aspects of the present invention, the fastener further comprises a first socket extending into the fastener adjacent to the first end face. The first socket is configured such that rotation of the first socket rotates the fastener. In illustrative implementations, the first socket comprises a hole in its base. The bore within the fastener includes internal threads along at least a portion thereof and the pintle includes an externally threaded portion that engages the internal threads of the bore. The pintle includes a second socket at an end proximate to the first socket, such that insertion of a tool through the hole in the first socket and into the second socket and rotation of the second socket relative to the first socket rotates the threaded portion of the pintle thus causing the pintle to axially traverse the bore to transition the pintle between the lock and unlock positions. In alternative exemplary implementations, the pintle further comprises a pin that extends through a hole in the base of the first socket. Here, the fastener further comprises an internal spring that biases the pintle such that the pintle can be manually slidably transitioned axially through the bore by a limited travel against the bias of the internal spring to transition the pintle between the lock and unlock positions.

BRIEF DESCRIPTION OF THE SEVERAL VIEWS OF THE DRAWINGS

FIG. 13 is a cross-section view of an embodiment of a fastener illustrating another ball locking configuration, where the ball locking configuration is in a locked position, according to various aspects of the present invention;

FIG. 14 is an end-view of the fastener of FIG. 13, according to various aspects of the present invention.

DETAILED DESCRIPTION

According to various aspects of the present invention, a quick change fastener is provided that addresses the need for fixture methods of machining material on equipment such as computer numerical control (CNC) equipment. In this regard, a fastener is disclosed that enables a user to quickly secure a work piece (e.g., a working material) to a work holder (e.g., a fixture plate) from the machining table side. The fasteners described herein may also temporarily secure a vise or other jig to a fixture plate. For example one or more fasteners can be utilized for quick and precise fixturing of a vise to a machine grid plate fixture.

As yet a few other illustrative examples, the fasteners described herein can be used to temporarily secure a fixture plate to a machine table sub-plate, a work holder to another work piece fixture, etc. A fastener can even be temporarily secured to another fastener. For instance, a first fastener having external threads can mate with a second fastener having internal threads in a manner analogous to a post screw. Such an embodiment may be used for manufactured materials that cannot be threaded easily, such as ceramics. Thus, a fastener, as described more fully herein, facilitates quick change of a material to be machined or manufactured to a work surface, and also facilitates quick change of fixtures and jigs to a work surface. Still further, a fastener as described herein may be utilized either manually or robotically.

During use, the disclosed fastener can be inserted into the fixture plate in an almost instantaneous timeframe. Likewise, the fastener can be relocated to a different location within the fixture plate in a rapid manner. Once positioned, a simple tool allows the fastener to be secured to the underside of the work piece (i.e., side of the work piece adjacent to the fixture plate). Moreover, the fastener disclosed herein allows for the use of a fixture plate that is simple to manufacture because each fixture location only needs a precision hole and a coaxial undercut hole.

Basic Overview of the Fastener According to Aspects of the Present Invention

Figure 1:
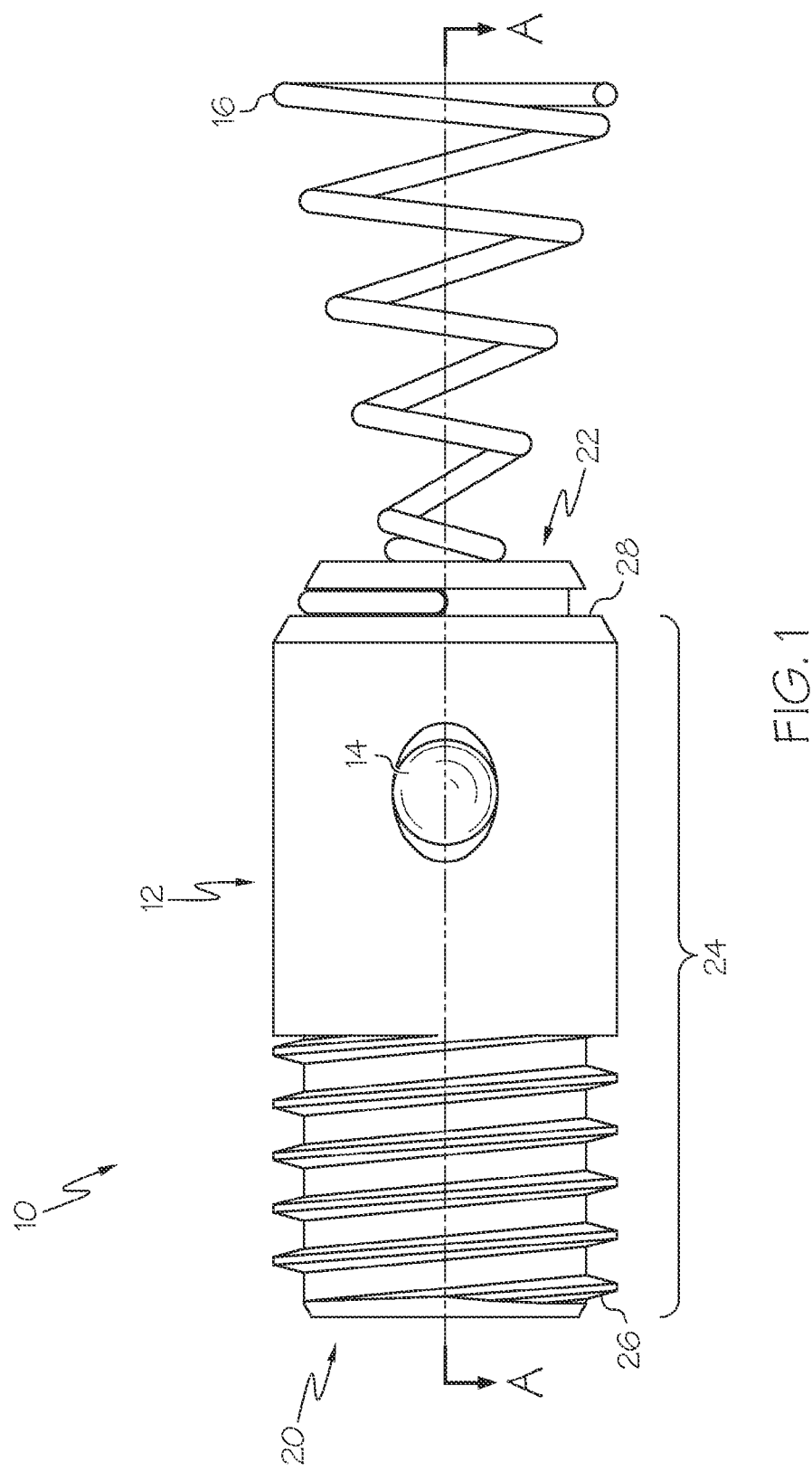
FIG. 1 is a side view illustration of a fastener, according to various aspects of the present invention.

Referring now to the drawings, and in particular to FIG. 1, a fastener 10 is illustrated, which is capable of temporarily fastening two objects together, examples of which are noted above. The fastener 10 includes in general, a housing 12, a locking feature 14 (also referred to herein as a torque node as will be described in greater detail herein) and an optional external spring 16.

In the illustrative implementation, the housing 12 includes a first end face 20, a second end face 22 located opposite the first end face 20, and a shaft 24 that extends between the first end face 20 and the second end face 22. The illustrated shaft 24 has two sections, including a threaded portion 26 and an unthreaded portion 28. The threaded portion 26 extends along the shaft 24 at the end proximate to the first end face 20. Additionally, the first end face 20 includes a socket or other suitable feature (not shown) for receiving a corresponding tool to rotate the fastener 10 as will be described in greater detail herein.

Although the shaft 24 is illustrated as having an unthreaded portion 28, such is not required. For instance, in certain implementations, it may be desirable to thread the entire length of the shaft 24, e.g., for legacy purposes to be backwards compatible with old work holders. In yet another exemplary implementation, the fastener 10 does not include a threaded portion 26 along the shaft 24. Rather, the entire length of the shaft 24 is unthreaded. Such a fastener 10 may be used for precision location (and not work piece clamping).

The locking feature 14 is illustrated as a ball locking device. As will be described in greater detail herein, one or more locking balls are contained within the housing 12. A locking ball port is provided for each locking ball. In the illustrated implementation, each port extends from the unthreaded portion 28 of the shaft 24 inward so that the corresponding locking ball can be transitioned from a recessed position, where the locking ball is within the housing 12, to a locked position, where the locking ball is transitioned outward through the port in a radial direction. Each locking ball port is slightly smaller than the diameter of the corresponding locking ball (towards the outside of the unthreaded portion of the shaft) so that the locking ball cannot fully release from the housing 12. For instance, in illustrative implementations, the locking feature 14 may include two to four locking balls. Moreover, the locking ball ports need not extend from the unthreaded portion 28 of the shaft 24 in practice. Rather, the locking ball ports can be positioned at any point along the shaft, as the specific application dictates. Moreover, although the exemplary implementations described herein utilize locking balls, in practice the lock balls may be a locking "dog" of some other shape such as a rectangular member.

The spring 16 is optional, but provides a convenience, such as a spring release from a work holder that the fastener 10 is installed in, as will be described in greater detail below. The spring 16 may not be required in certain applications, such as where a special fixture plate may actuate the fastener 10 with air pressure. In yet another illustrative embodiment, the unthreaded portion 28 of the fastener shaft 24 has a smaller diameter than the larger thread diameter of the threaded portion 26 of the shaft 24. This allows the fastener 10 to be installed from the top-side of the material to be machined. In use, the operator threads the fastener 10 in from the top of the material in a clockwise manner with the lock balls not actuated until the fastener 10 bottoms out. The operator then actuates the lock balls using the locking feature 14. The user then rotates the fastener 10 counterclockwise to thread the fastener 10 back up into the material, thus clamping the material to the work surface.

Exemplary Use of the Fastener of FIG. 1

In a typical use, the unthreaded portion 28 of the shaft 24 is secured to a work holder such as a fixture using the locking feature 14 of the fastener 10. The optional spring 16 can be utilized, for instance, to provide a spring-release of the fastener 10 from the work holder to expedite the changeover, removal or relation of the fastener from its location in the work holder. The threaded portion 26 is threaded into a work piece to temporarily hold, support and locate the work piece relative to the work holder.

Figure 2:
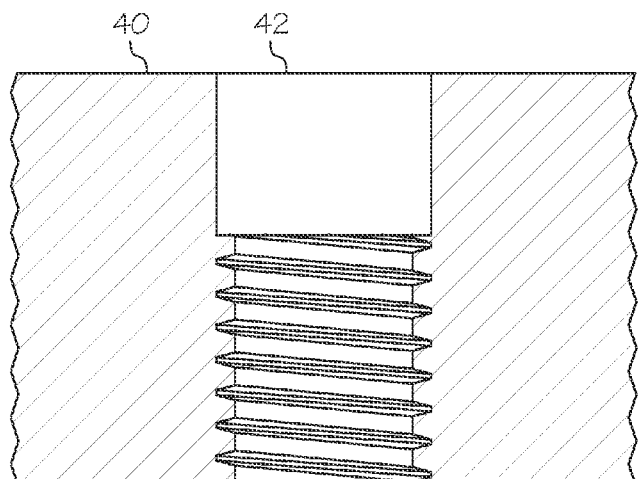
FIG. 2 is a cross-section view of a work piece showing a threaded portion for temporarily securing to the fastener of FIG. 1, according to various aspects of the present invention.

To illustrate an exemplary use of the fastener 10, reference is made to FIG. 2 through FIG. 5. FIG. 2 illustrates a section of an exemplary work piece 40 to be fastened to a work holder (FIG. 3) by the fastener 10. The work piece 40 is illustrated as a simple plate for clarity of discussion herein. However, in practice, the work piece 40 can comprise any shape or material, including a complex shape and/or composite material. The work piece 40 includes an aperture 42 that extends entirely through the work piece 40 from a top surface through the bottom surface. At least a portion of the aperture 42 comprises threading 44. The threading 44 is complimentary to the threaded portion 26 of the shaft 24 of the fastener (shown in FIG. 1).

Assume for sake of example, that the fastener 10 is intended for a ½-inch (approximately 1.27 centimeter) hole. In this example, the threaded portion 26 of the fastener 10 may comprise ½-inch-13 UNC-2A (external threads) as a non-limiting but illustrative example. Keeping with the example, the threading 44 within the aperture 42 may comprise ½-inch-13 UNC-2B (internal threads). In practice, the unthreadedd portion of the aperture 42 need not have the same diameter as the threading 44 through the work piece 40. For instance, the threading 44 should match up with the dimensions of the threaded portion 26 of the fastener 10. However, the hole that exits the top of the work piece 40 defined by the aperture 42 may be larger, smaller or the same size as the dimensions for the threading 44. In most typical applications, the hole exiting the top of the work piece 40 need only be large enough to insert a tool, typically a wrench, through the aperture 42.

For instance, the first end face 20 of the fastener 10 may include a ¼-inch (0.635 cm) Allen socket hex end that receives a corresponding ¼-inch (0.635 cm) Allen wrench to install and remove the fastener 10 into/from the work piece 40. Thus, the hole exiting the top of the work piece 40 need only be large enough to accommodate that particular tool. Alternatively, the socket may be configured for a star drive, square drive, or any other internal drive such as a spline.

Figure 3:
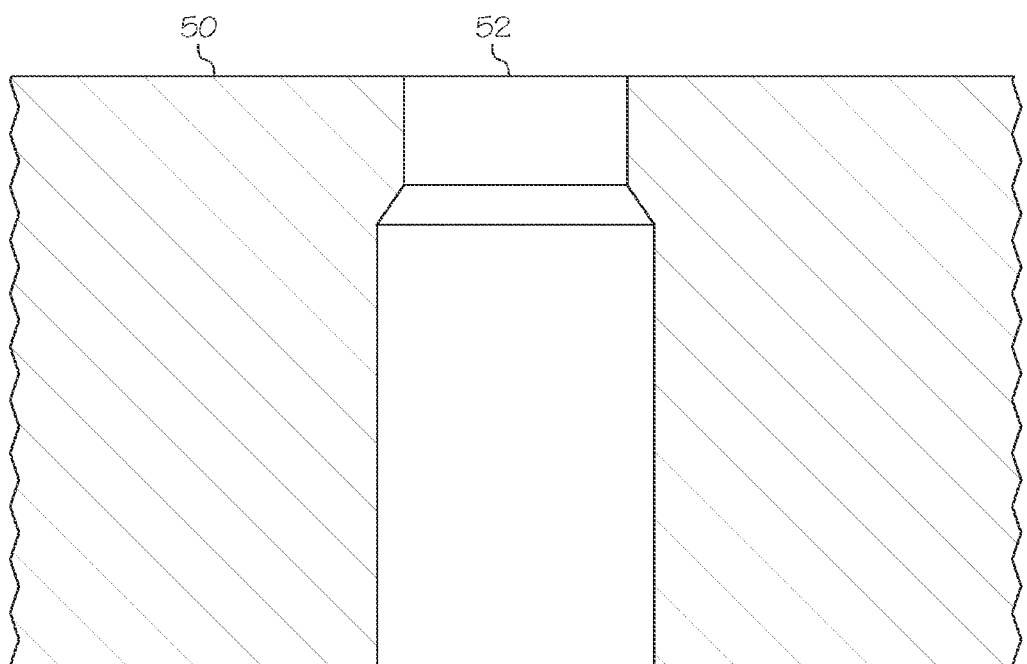
FIG. 3 is a cross-section view of a work holder such as a fixture, showing a fixture hole having an undercut, according to various aspects of the present invention.

Referring to FIG. 3, a section of a work holder 50 is illustrated as a fixture plate. In practice, the work holder 50 may comprise a fixture, jig or other suitable holding device or surface. Moreover, the work holder 50 is illustrated as a plate for simplicity of discussion herein. In practice, the work holder 50 can take on any shape and may be constructed of any suitable material(s). The work holder 50 includes a first fixture hole 52 that extends into the work holder 50 from a top surface. The work holder 50 also includes a ball lock undercut 54 that extends into the work holder 50 below and coaxial with the fixture hole 52.

Figure 4:
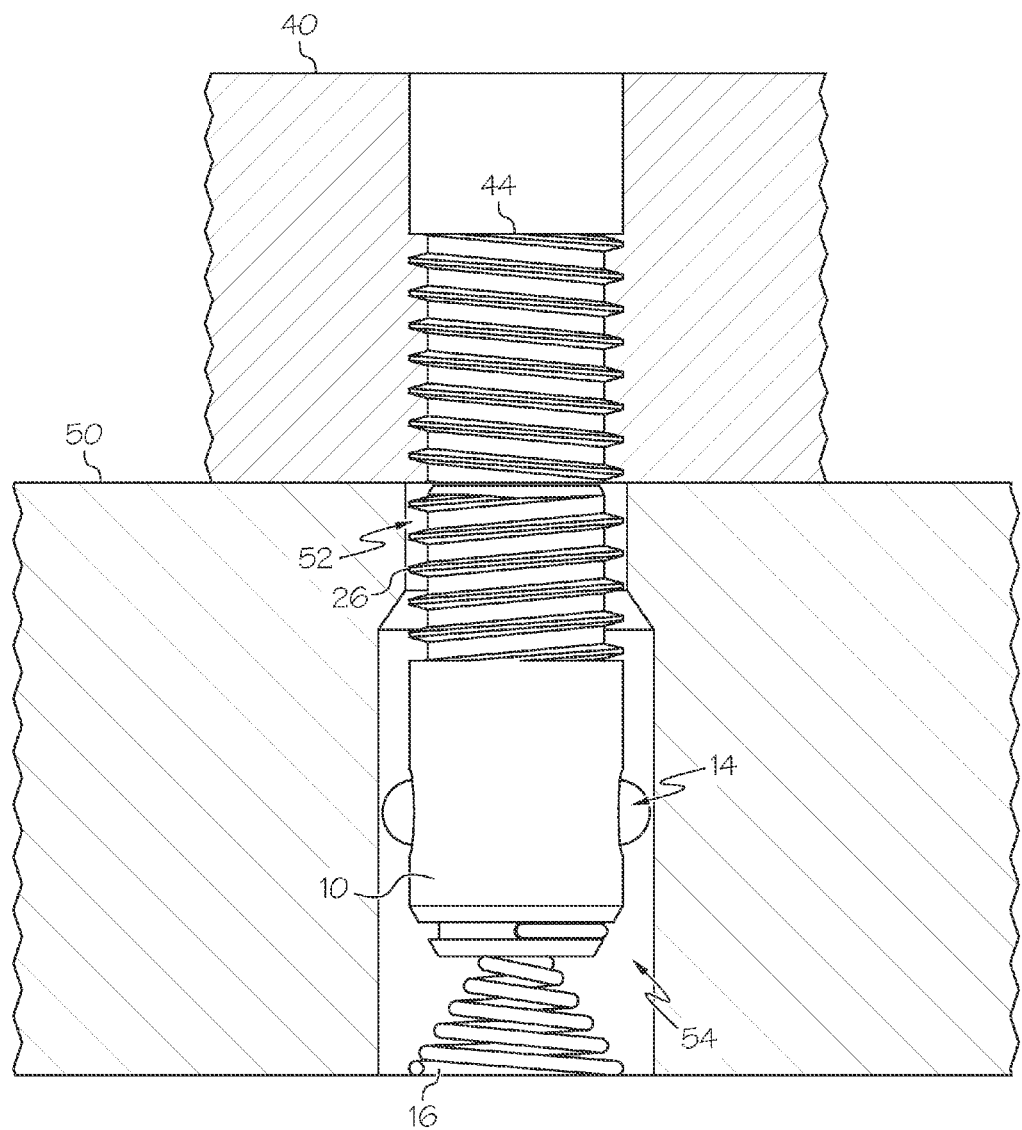
FIG. 4 is a cross-section view of the work piece of FIG. 2 positioned over the work holder of FIG. 3 with the fastener of FIG. 1 recessed into the work holder, where a locking feature of the fastener is in an unlocked position, according to various aspects of the present invention.

Referring to FIG. 4, the fastener 10 is illustrated as having been inserted in the fixture hole 52 of the work holder 50. The tolerance of the diameter of the fastener 10 is configured relative to the diameter of the fixture hole 52 for a relatively close fit. However, the fastener 10 preferably easily inserts into the fixture hole 52. Moreover, the locking feature 14 of the fastener 10 is in an unlocked position. In the unlocked position, the locking balls can recess into the housing 12 of the fastener 10. This allows the fastener 10 to insert into the fixture hole 52 without binding. The work piece 40 is positioned over the work holder 50, such as by using locator pins, a fastener 10 having an unthreaded shaft 24, or other conventional techniques. In the illustrative example, the positioning of the work piece 40 over the work holder 50 at least partially compresses the spring 16.

In this illustrative implementation, the threaded portion 26 of the fastener 10 in aligned with and is in engagement with (or near engagement with) the threading 44 of the work piece 40. Either before or after positioning the work piece 40 relative to the work holder 50, a user transitions the locking feature 14 of the fastener 10 to the locked position (described in greater detail herein). When the locking feature 14 is in a locked position, the locking balls partially extend out from the shaft 24 in a radial direction and are maintained in the extended position. However, because the fastener 10 is inserted into the fixture hole, the locking balls fit into the ball lock undercut 54. The fastener 10 will now torque into the work piece 40 clamping the work piece 40 to the work surface 50.

Figure 5:
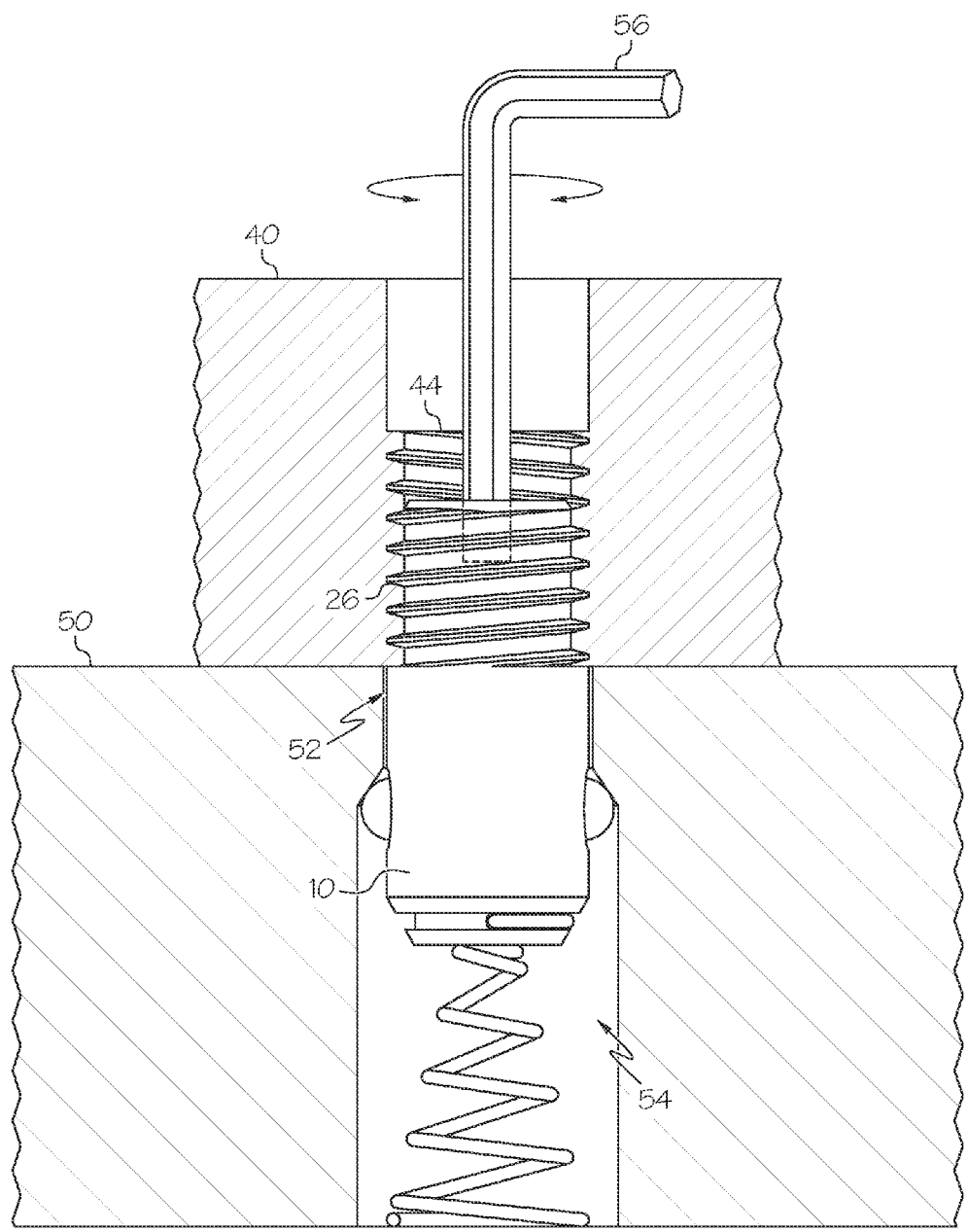
FIG. 5 is a cross-section view of the configuration of FIG. 4, where a locking feature (torque node) of the fastener is in a locked position, and the fastener has been bolted into the work piece, according to various aspects of the present invention.

Referring to FIG. 5, the fastener 10 is shown fastening the work piece 40 to the work holder 50. In order to fasten the work piece 40 to the work holder 50, a user inserts a tool 56, such as an Allen wrench in the illustrative example, through the work piece 40 and into a socket within the first end face 20 of the fastener 10. The user proceeds to tighten the threaded end 26 of the fastener 10 into the complimentary threading 44 of the work piece 40 (e.g., in a back bolt fashion) so that the fastener 10 becomes temporarily secured to the work piece 40. Moreover, because the locking feature 14 of the fastener 10 is in a locked position, the locking balls engage the hole walls within the work holder 50. For instance, as illustrated, the locking balls engage the horizontal (or chamfered) surface of the ball lock undercut 54. The locking balls may also and/or alternatively contact the side walls of the ball lock undercut 54. At this point when the fastener 10 is tightened into the work piece 40, the locking balls function as a torque node as torque is applied with the tool used to operate the locking feature 14.

The fastener 10 can utilize any reasonable number of locking balls. For instance, a fastener 10 may include two to four locking balls, as noted above. Regardless of the number of locking balls, because the fixture hole 52 and corresponding ball lock undercut 54 are generally round in cross-section, there is no requirement to align the fastener 10 in any particular orientation because the locking balls can react with the surface along any point of the circumference of the undercut 54.

The section of the work holder 50 described above with reference to FIG. 3-FIG. 5 is simplified for clarity of discussion herein. However, in practice, the work holder 50 can include any number of undercuts or chambers, as the particular application dictates.

Figure 6:
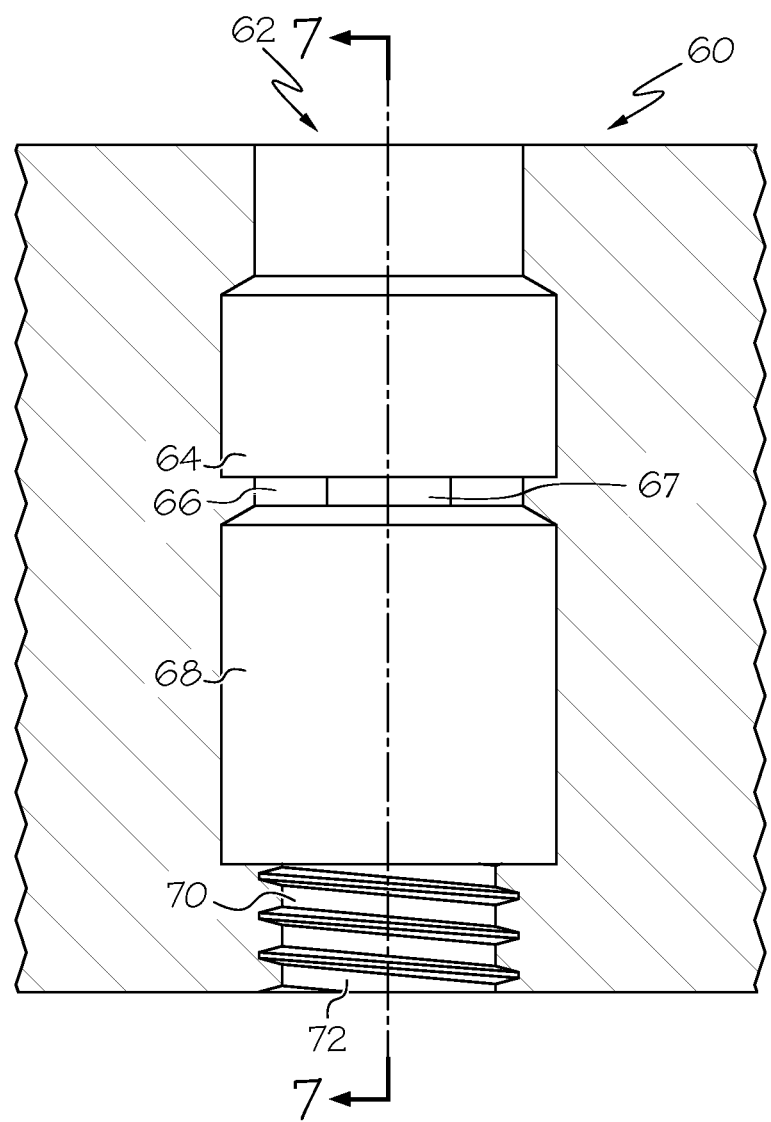
FIG. 6 is a cross-section of an alternative implementation of a hole in a work holder for temporarily securing the fastener of FIG. 1, according to various aspects of the present invention.
Figure 7:
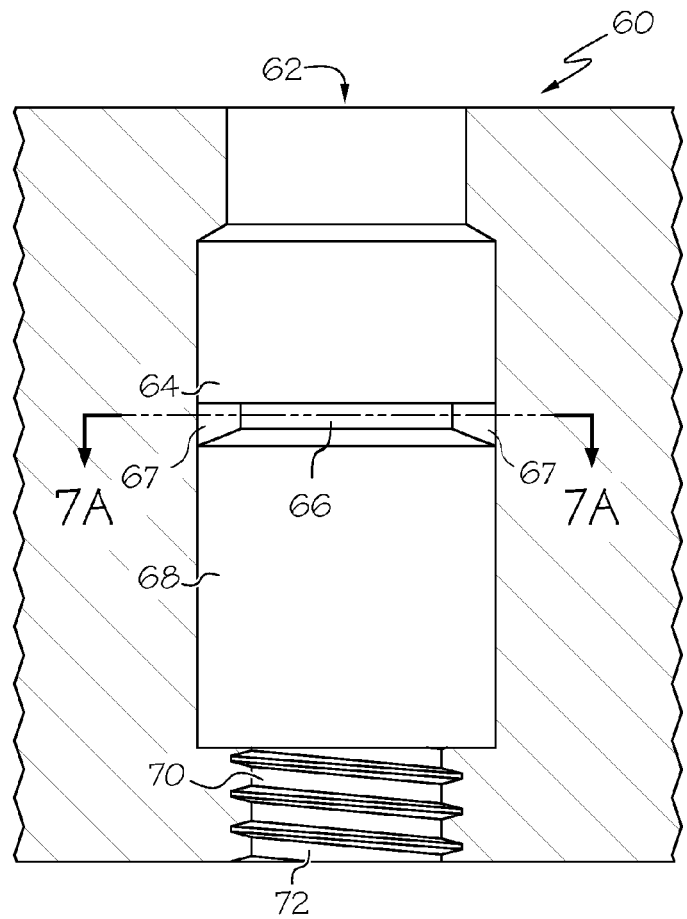
FIG. 7 is a view of the work holder of FIG. 6, taken at a cross section that is orthogonal to the view of FIG. 6, according to various aspects of the present invention.

For purposes of clarity of discussion and not limitation, reference is made to FIG. 6 and FIG. 7, which illustrate a section of another embodiment of a work holder 60, which is different than the work holder 50 of FIG. 3. FIG. 6 illustrates a cross-section cut out of a hole in the work holder 60 that is orthogonal to the cross section cut out of the hold in the work holder 60 of FIG. 7.

Figure 7A:
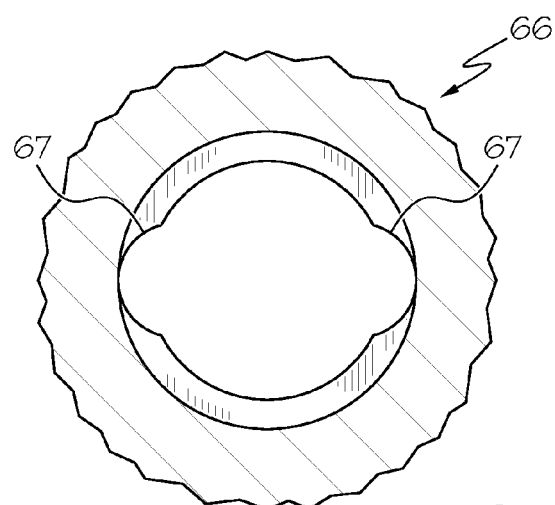
FIG. 7A illustrates a cross section looking top-down on just the first transition section of the hole in the work holder of FIG. 6 and FIG. 7, according to various aspects of the present invention.

With reference to FIG. 6 and FIG. 7 generally, the work holder 60 includes a fixture hole 62 that is analogous to the fixture hole 52 described with reference to FIG. 3. The work holder 60 also includes a ball lock undercut 64 that is analogous to the ball lock undercut 54 described with reference to FIG. 3. However, the illustrated work holder 60 also includes a number of optional compartments that are aligned coaxial with the fixture hole 62. Any one or more of the below discussed additional compartments can be formed in the work holder 60. For instance, as illustrated, the work holder 60 includes a first transition 66, such as a hole with radial cutouts. With reference to FIG. 7A, a top down view of the first transition 66 illustrates radial cutouts 67 that are 180 degrees apart. This is particularly useful with a fastener 10 having a locking feature 14 with two locking balls, as will be described in greater detail below. However, in practice, the cutouts 67 can have other configurations and may be optional.

Referring back to FIG. 6 and FIG. 7 generally, the work holder 62 also includes a fastener storage undercut 68, a second transition 70 and a threaded section 72. As illustrated, the first transition 66 is aligned coaxially below the ball lock undercut 64 having a diameter smaller (at least in parts) of the ball lock undercut 64 and fastener storage undercut 68.

The fixture hole 62 may be separately manufactured as an insert or "body" with a threaded external diameter that can be threaded into any fixture plate or work holder.

With reference to FIG. 6, FIG. 7 and FIG. 7A generally, the first transition 66 in cooperation with the fastener storage undercut 68 allows a user to lock down a fastener 10 into a lower compartment so that the fastener 10 is completely recessed within the work holder 60 and thus remains clearly below the surface of the work holder 60. This allows convenient storage of the fastener 10 and allows a clean work area, e.g., to move the work piece into and out of position on the work holder 60. Particularly, the radial cutouts 67 of the first transition 66 allow the locking balls of a fastener 10 to be lowered in the work holder 60 from the ball lock undercut 64 to the fastener storage undercut 68 without transitioning the locking feature to an unlocked state.

An operator rotates the fastener within the work holder 60 until the locking balls align in register with the radial cutouts 67. Once aligned, the operator depresses the fastener down until the locking balls pass through the first transition 66 and into the fastener storage undercut 68. Once the locking balls are within the fastener storage undercut 68, the operator rotates the fastener ¼ turn, which will "store" the fastener below the surface of the work holder. Thus once the fastener 10 is in the work holder and the lock balls are extended in the locked position, the operator does not have to further lock or unlock the locking balls to either store or use the fastener 10 to secure material, fixtures, etc. to a work surface, because the locking balls, even in the locked position, can pass through the radial cutouts 67.

Figure 8:
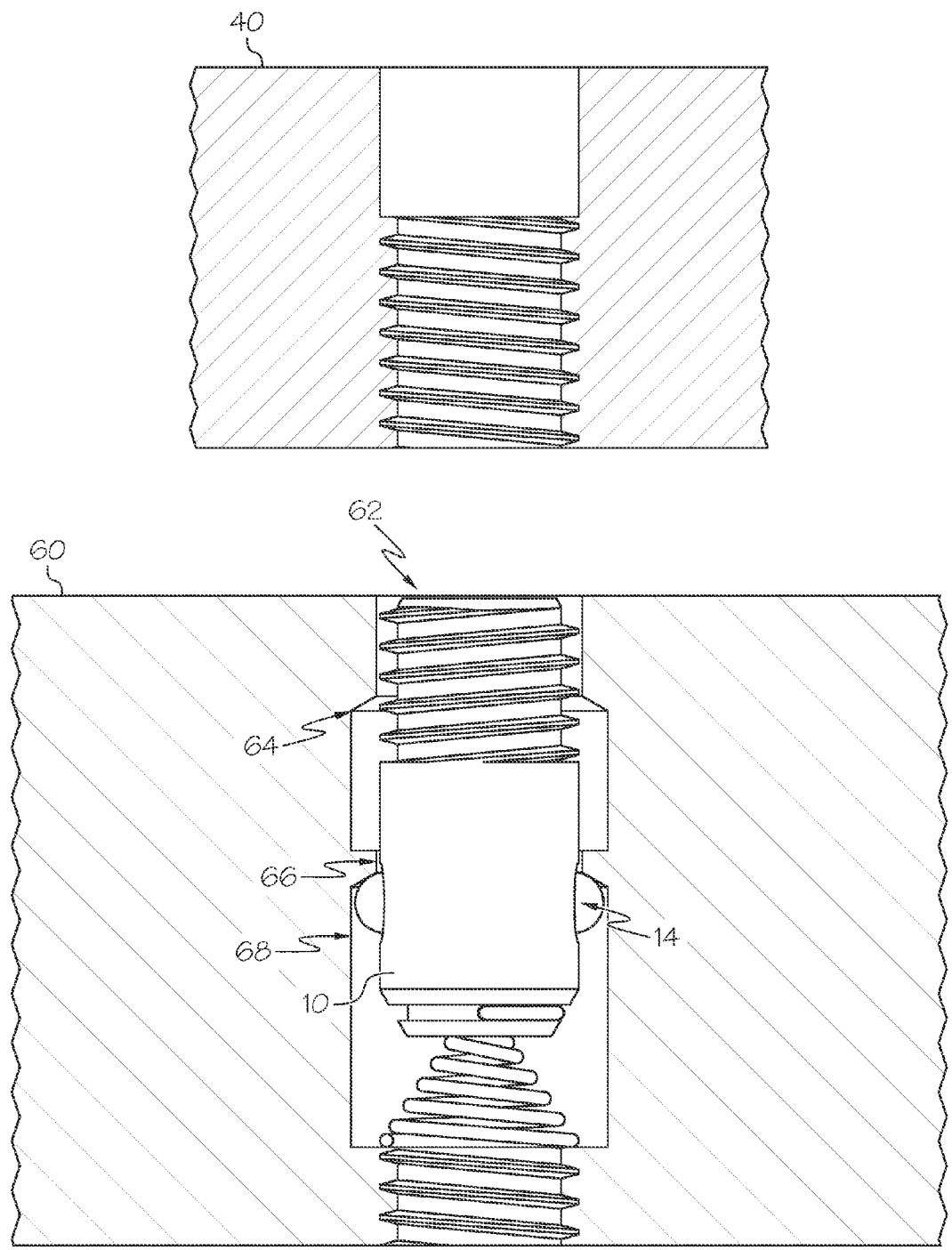
FIG. 8 is a illustration of the work holder of FIG. 6 used to stow a fastener, according to various aspects of the present invention.

Referring to FIG. 8, a fastener 10 is illustrated as being stowed in a work holder 60. In this manner, the first transition 66 cooperates with the fastener storage undercut 68 to provide a surface (horizontal surface or chamfered surface at the intersection of the first transition 66 and the fastener storage undercut 68) to provide a shelf or other suitable surface/surface combination to engage the locking balls of the locking feature 14 of the fastener 10.

For instance, the locking feature 14 of the fastener 10 can be set to an unlocked state and the fastener 10 can be pushed down so as to lower the locking feature 14 below the fastener storage undercut 68.

Alternatively, in an example, assume that a fastener 10 includes a locking feature 14 having two locking balls, and that the first transition region 66 includes two radial cutouts 180 degrees apart, e.g., as best illustrated in FIG. 7A. The fastener 10 may already be locked in to the area under the ball lock undercut 64. In this exemplary configuration, a user does not need to unlock the locking feature 14. Rather, the user turns the fastener 10 a ¼ turn (for the two ball device), either clockwise or counter clockwise, to allow the locked balls to align with and to pass through the radial cutouts 67, thus allowing the fastener to drop down into the work holder 60 so that the locking balls of the locking feature 14 enter the area below the fastener storage undercut 68. By providing a ¼ turn of the fastener to transition the locking balls out from under the radial cutouts 67, the fastener can be stowed in the work holder 60. Thus, once stowed, the locking balls no longer align with the radial cutouts 67 but rather, engage the storage undercut 68. Because the fastener 10 is stowed within the work holder 60 as illustrated, the work piece 40 can be easily positioned to align with the hole in the fixture hole 62 of the work holder 60.

Figure 9:
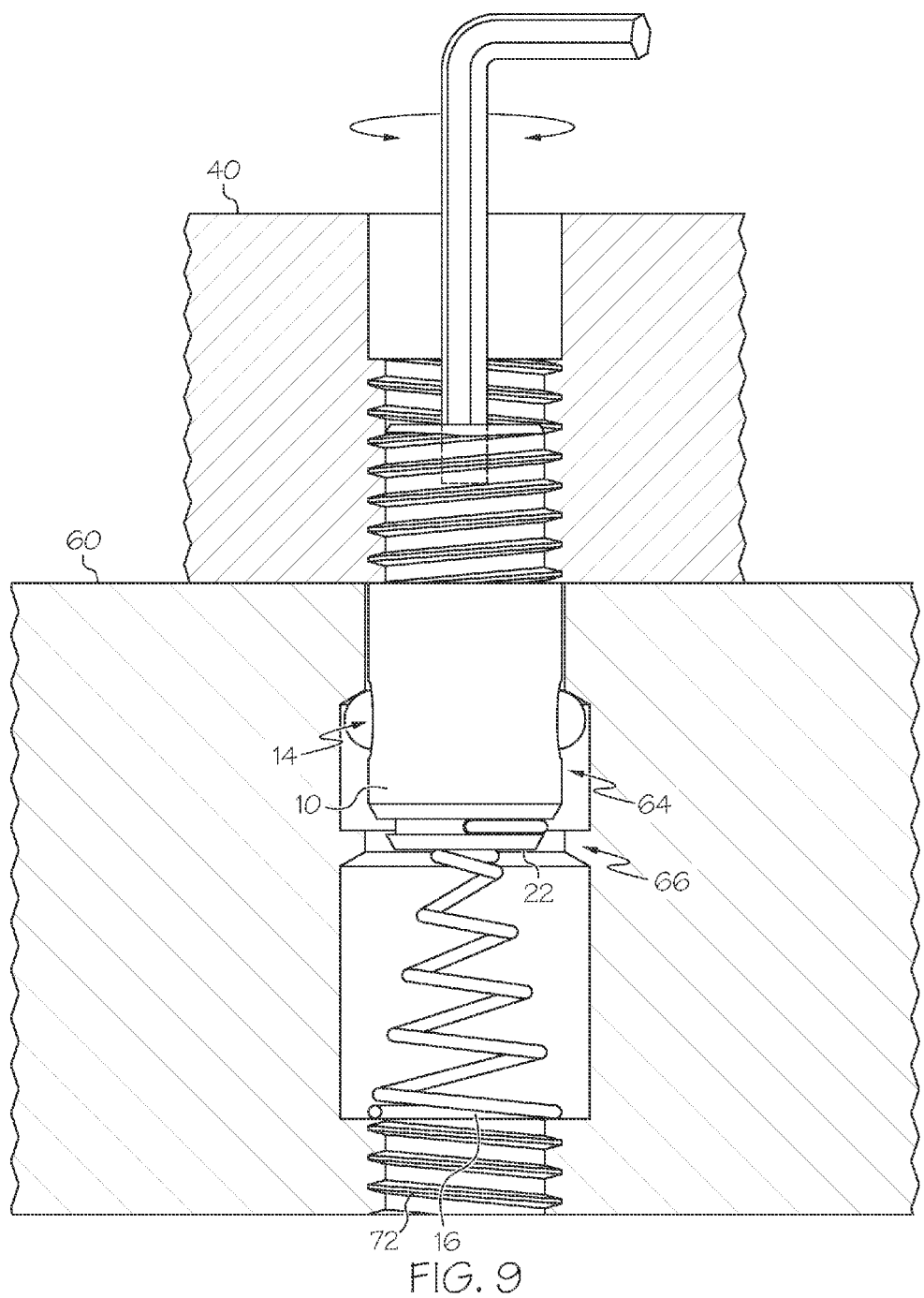
FIG. 9 is a illustration of the work holder of FIG. 6 used in cooperation with a fastener to attach to a work piece or other object, according to various aspects of the present invention.

Referring to FIG. 9, when it is time for use, the locking feature 14 of the fastener 10 can be transitioned, allowing the spring 16 to extend the fastener 10 upwards. For instance, the locking feature 14 of the fastener 10 can be set to an unlocked state, thus allowing the fastener 10 to rise up through the first transition 66. Alternatively, keeping with the above example of a fastener with two lock balls, a user can apply a ¼ turn either clockwise or counter clockwise to the fastener to align the locking balls with the radial cutouts (e.g., see radial cutouts 67 is FIG. 7A). The fastener 10 then slips up through the first transition 66. The locking feature 14 then locks the locking balls against the ball lock undercut 64 as described more fully herein. The fastener 10 can then be threaded up into a work piece 40 positioned over the work holder 60, e.g., in a manner analogous to that described above with reference to FIG. 3-FIG. 5.

The optional threaded section 72 can be used for instance, to provide for legacy fixture bolts (such as precision shoulder bolts), to provide implementations of the fastener 10 that include a threaded portion adjacent to the second end face 22, or for other suitable uses, e.g., installing the fastener 10 upside down for particular applications where the locking feature 14 locks into the work piece or other suitable applications.

The section of the work holders 50 and 60 described herein is presented for convenience of illustration. In practice, it is likely that the work holder will have significantly more holes. For instance, the work holder may be specifically configured for the machining of a specific work piece. Additionally, in many instances, the shape of the work piece and the machining operation to be performed allow for the use of a general-purpose work holder that is adaptable to different machines and many different parts. Since the work holder is not work piece specific, the work holder can be used for a variety of different or limited-production runs. Moreover, although shown in the above-described figures as a plate, the work holder can take a modular approach allowing any number of configurations, depending upon the desired application.

By way of illustration, a typical fixture plate suitable for use with the fastener 10 may have a grid pattern of holes on 2 inch (5.08 cm) or tighter center-to-center spacing. In this manner, each hole is constructed substantially as described with reference to FIG. 3 and/or FIG. 6. In the above-example, every square foot (approximately 30.5 cm$^2$) of fixture plate would have 36 of the holes. A typical small machine plate may thus have on the order of 200 holes whereas a large fixture plate may have over 1,000 holes. The diameter of each hole is approximately ½-inch (1.27 cm) in an illustrative implementation. However, in practice, any reasonable diameter may be used, so long as the dimensions of the fastener, threading in the work piece, and fixture hole/ball lock undercut of the work holder correspond as described more fully herein.

The action of the external threads being tightened in the work piece keeps the work tight to the work holder. The locking balls provide a torque node/abutment that allows the action of screwing the external threads of the fastener into the work piece to perform a clamping function.

The Locking Feature

As noted in greater detail above, the locking feature 14 of the fastener 10 can be transitioned between an unlocked position and a locked position. In the unlocked position, locking balls can recess within the housing 12 of the fastener. However, in the locked position, the locking balls are extended outward in a radial direction from the shaft 24 of the fastener 10 and are retained in this extended position. In practice, any number of suitable structures can be utilized to transition the locking feature 14 between locked and unlocked positions.

Figure 10:
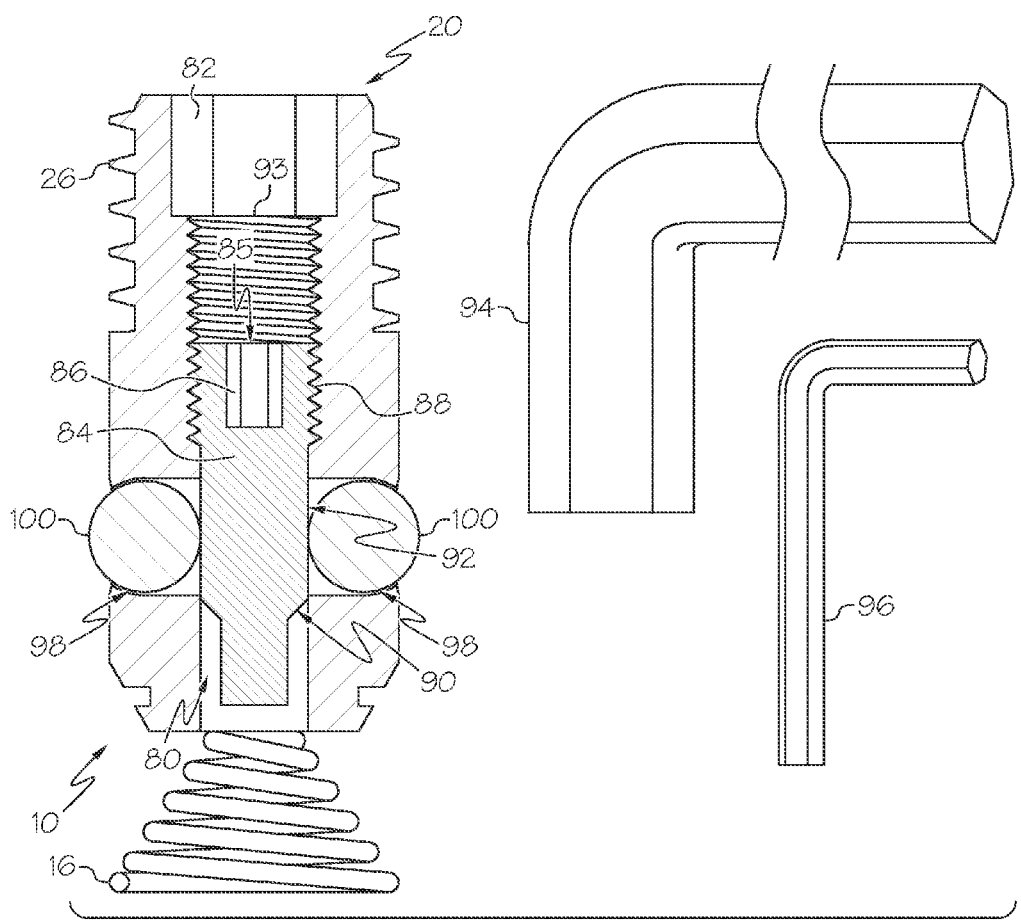
FIG. 10 is a cross-section view of a fastener, illustrating ball locking configuration in a locked position, according to various aspects of the present invention.

Referring to FIG. 10, a fastener having a first illustrative locking feature is described. The fastener 10 of FIG. 10 is shown in a cross-sectional view, taken cut along line A-A of FIG. 1 to show the various internal components of the fastener 10 that operate the locking feature 14. In general, fastener 10 includes the same external features described above with reference to FIG. 1. As such, those features will not be re-described.

The internal features of the fastener 10 according to certain illustrative aspects of the present invention comprise a central bore 80 that extends axially at least partially through the housing 12 from the first end face 20. Proximate to the first end face 20 is a first socket 82.

Figure 11:
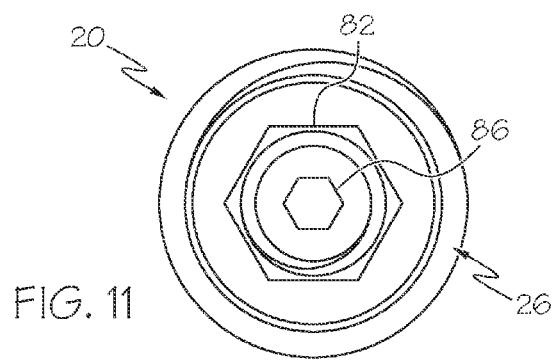
FIG. 11 is an end-view of the fastener of FIG. 10, according to various aspects of the present invention.

Referring briefly to FIG. 11, in illustrative embodiments, the first socket 82 extends from the first end face 20 of the fastener 10. The first socket 82 is provided to allow the fastener to be screwed into a structure, e.g., a work piece as described above with reference to FIG. 2 through FIG. 9. For instance, the first socket 82 may comprise an Allen socket hex end. Keeping with the example of a ½-inch diameter fastener, the first socket may be configured to accept a ¼-inch (0.635 cm) Allen wrench. However, in practice, other configurations can be used.

Referring back to FIG. 10, a pintle 84 is positioned within the bore 80 below the first socket 82. The pintle 84 includes an actuation end 85, which is implemented in the illustrative embodiment as a second socket 86. The pintle 84 also includes a rod 88 that extends axially through the bore 80 from the actuation end of the pintle 84. The rod 88 includes a ball transitioning surface 90 and a ball locking surface 92, which is adjacent to the ball transitioning surface 90.

The illustrated pintle 84 is configured like a set screw type of structure. The pintle 84 includes external threads along the outer surface of the rod 88 that engages corresponding inner surface threads of the bore 80. The second socket 86 is integrated into the rod 88 such that turning the second socket 86 also turns the rod within the bore 80. This allows the pintle 84 to traverse axially within the bore 80.

In the illustrative embodiment, an opening 93 is provided within the base of the first socket 82 to access the second socket 86. The second socket 84 is axially aligned with the opening 93 and can thus be accessed with any suitable tool, e.g., an Allen wrench of smaller size than the Allen wrench required for operating the first socket 82. For instance, a first Allen wrench 94 can be used with the first socket 82 to raise and lower the fastener 10 into a work piece as described in greater detail herein. A second, smaller Allen wrench 96 can be used with the second socket 86 to cause the pintle 84 to threadably traverse axially within the bore 80 of the fastener 10 to transition the locking feature between locked and unlocked states. In an illustrative example, the first Allen wrench 94 comprises a ¼ inch (0.635 cm) and the second Allen wrench 96 comprises a ⅛ inch (0.3175 cm) wrench. The first socket 82 is primarily open. In this regard, there maybe a small "material roll" over from a broaching operation to prevent the pintle 88 from backing out of the body.

The fastener 10 also includes at least one ball lock aperture 98 extending from the bore 80 radially out leading to a ball lock port through the shaft 24 of the housing 12. A locking ball 100 is provided for each ball lock aperture 98. Each locking ball 100 has a diameter larger than the diameter of the associated ball lock aperture 98 at or near the surface of the shaft (the ball lock port). As such, the locking balls 100 cannot escape the housing of the fastener through a corresponding ball lock aperture 98. (As noted above, although illustrated as locking balls for convenience of discussion, the components 100 may alternatively be locking "dogs" of other shapes instead of balls).

FIG. 10 illustrates the locking balls 100 in a locked state. In this regard, the pintle 84 is extended into the fastener. As such, the second Allen wrench 96 is deep enough to reach through the opening 93 in the base of the first socket 82 so as to engage the second socket 86 within the bore 80.

In FIG. 10, the pintle 84 is threaded axially through the bore 80 so that the ball locking surface 92 of the rod 88 engages the locking balls 100. Particularly, the fastener 10 is illustrated in a designated lock position, where the ball locking surface 92 of the pintle 84 is aligned in register with each ball lock aperture 98. In an illustrative implementation, the ball locking surface 92 is generally cylindrical and is dimensioned to correspond with the cross-sectional dimension of the bore 80. Due to the dimensions bore 80, the ball locking apertures 98 and corresponding locking balls 100, the ball locking surface 92 urges the locking balls 100 through their respective ball locking aperture 98, and creates an abutment surface that prevents the locking balls 100 from retreating back into the housing of the fastener 10.

Figure 12:
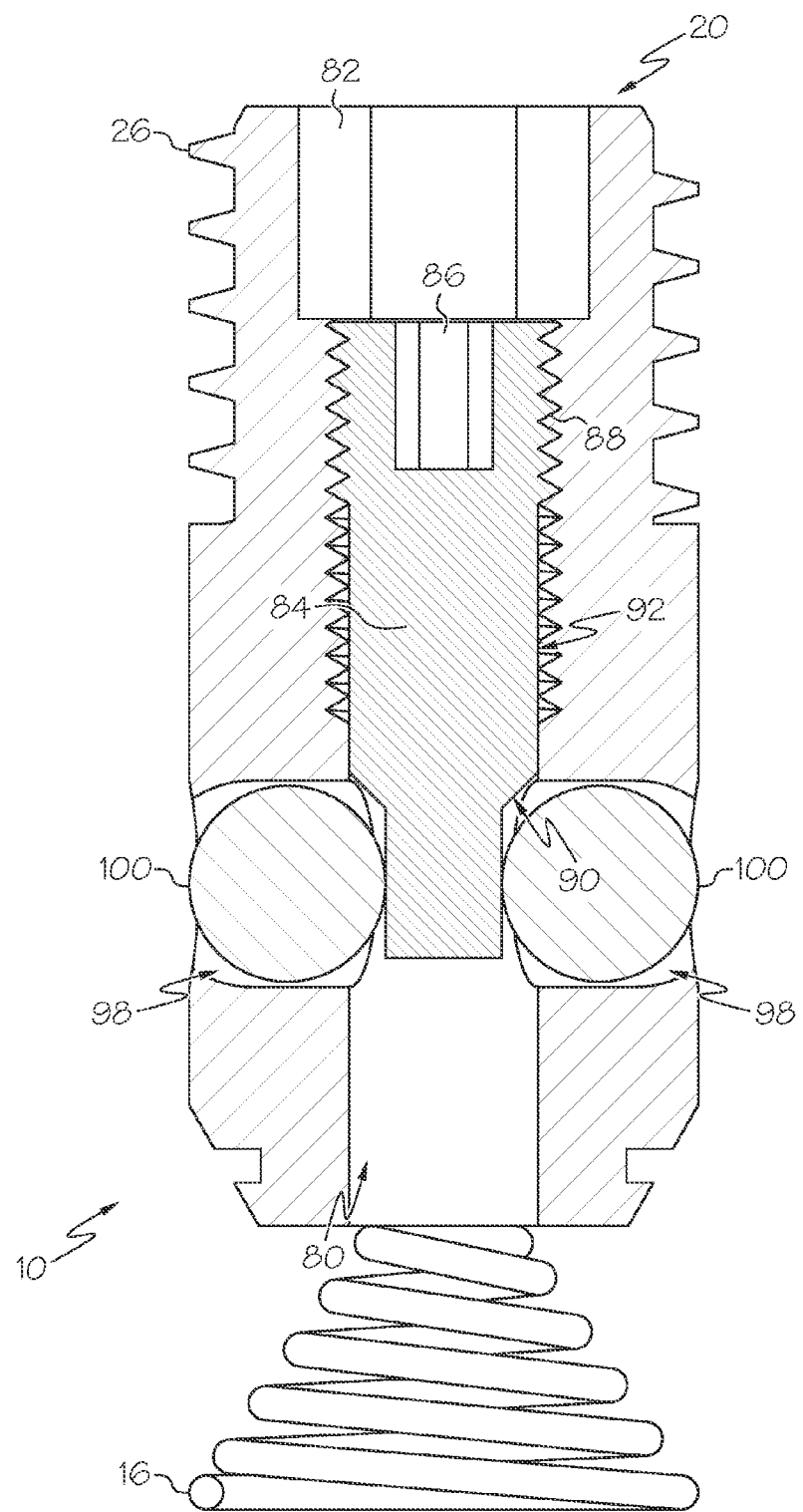
FIG. 12 is a cross-section view of the fastener of FIG. 10 in an unlocked position, according to various aspects of the present invention.

Referring to FIG. 12, the fastener 10 is illustrated in an unlocked position. As illustrated, the pintle 84 has been axially repositioned relative to its position in FIG. 10. Particularly, the pintle 84 is positioned (e.g., by rotating the second socket 86 so as to threadably advance the pintle 84 through the threaded bore 80) to a designated unlock position. In the designated unlock position, the ball locking surface 92 of the pintle 84 is moved axially away from each ball lock aperture 98. As illustrated, a narrowed portion of the rod 88 is now positioned generally in register with the ball lock apertures 98. As such, due to the gap between the narrowed portion of the rod 88 and the bore 80, the locking balls 100 are allowed to fully retreat into the housing.

When transitioning the fastener 10 from the designated unlocked position to the designated locked position, the ball transitioning surface 90 provides a ramp that directs the locking balls 100 to drive out into their respective ball lock aperture 98. After ramping the locking balls 100 into their ball lock aperture 98, the ball locking surface 92 again aligns with the ball lock apertures 98 (and may abut against the locking balls 100) thus locking the locking balls into their extended position.

Referring to FIG. 13, a fastener having a second illustrative locking feature is described. The fastener 10 of FIG. 13 is also shown in a cross-sectional view, taken cut along line A-A of FIG. 1 to show the various internal components of the fastener 10 that operate the locking feature 14. In general, fastener 10 includes the same external features described above with reference to FIG. 1. As such, those features will not be re-described.

The internal features of the fastener 10 according to certain illustrative aspects of the present invention comprise a central bore 110 that extends axially at least partially through the housing 12 from the first end face 20. Proximate to the first end face 20 is a first socket 112.

Referring briefly to FIG. 14, in illustrative embodiments, the first socket 112 extends from the first end face 20 of the fastener 10. The first socket 112 is provided to allow the fastener to be screwed into a structure, e.g., a work piece as described above with reference to FIG. 2 through FIG. 9 in a manner analogous to that set out more fully herein.

Referring back to FIG. 13, a pintle 114 is positioned within the bore 110 below the first socket 112. The pintle 114 includes an actuation end 115, which is implemented in the illustrative embodiment as a pin 116 that extends through an aperture in the base of the first socket 112. The pintle 114 also includes a rod 118 that extends axially through the bore 110 from the actuation end of the pintle 114. The rod 118 includes a ball transitioning surface 120 and a ball locking surface 122, which is adjacent to the ball transitioning surface 120. In the exemplary implementation illustrated, the ball transitioning surface 120 and corresponding ball locking surface 122 are in an opposite orientation compared to the analogous ball transitioning surface 90 and ball locking surface 92 described with reference to FIG. 10 through FIG. 12.

The illustrated pintle 114 is biased by an internal spring 124. A pintle stop 126 is secured to the rod 118 of the pintle 114 to provide a first engagement surface with the internal spring 124. The opposite end of the spring 124 is fixedly positioned within the housing, e.g., by a spring securement 128. As such, the pintle stop 126 can traverse axially along with the pintle 114, whereas the spring securement 128 is fixed and does not move with the pintle 114. As such, the internal spring 124 can set the limits of travel of the pintle 114, and provides a spring bias to orient the pintle 114 in a default position, which is a designated locked position as illustrated. Thus, for example, the internal spring 124 biases the pintle 114 such that the pintle 114 can be manually slidably transitioned axially through the bore 110 by a limited travel against the bias of the internal spring 124. Upon release of manually applied pressure to the pintle 114, the internal spring 124 returns the pintle 114 to its default position.

In the illustrative embodiment, a first Allen wrench 130 (or any other type of drive device) can be used with the first socket 112 to raise and lower the fastener 10 into a work piece as described in greater detail herein. The first Allen wrench includes a hole 132 in the working end of the wrench that is dimensioned to slip over the actuation end of the pintle 114 so that the fastener 10 can be rotated without depressing the pintle 114.

A second Allen wrench 134 (shown in FIG. 15) is identical in size to the Allen wrench 130 except that the second Allen wrench 134 does not include a hole in the working end. As such, the second Allen wrench (or some other tool) can be used to selectively depress the pintle 114 to transition the locking mechanism to a designated unlocked position as will be described in greater detail below.

The fastener 10 also includes at least one ball lock aperture 136 extending from the bore 110 radially out through the shaft 24 of the housing 12. A locking ball 138 is provided for each ball lock aperture 136. Each locking ball 138 has a diameter larger than the diameter of the associated ball lock aperture 136. As such, the locking balls 138 cannot escape the housing of the fastener through a corresponding ball lock aperture 136 in a manner analogous to that described for like parts in FIG. 10 through FIG. 12.

FIG. 13 illustrates the locking balls 138 in a locked state. The pintle 114 is biased by the internal spring 124 such that the ball locking surface 122 of the rod 118 engages the locking balls 138. Particularly, the fastener 10 is illustrated in a designated lock position, where the ball locking surface 122 of the pintle 114 is aligned in register with each ball lock aperture 136. In an illustrative implementation, the ball locking surface 122 urges the locking balls 138 through their respective ball lock aperture 136 and creates an abutment surface that prevents the locking balls 138 from retreating back into the housing of the fastener 10 in a manner analogous to the corresponding parts in FIG. 10 through FIG. 12.

Figure 15:
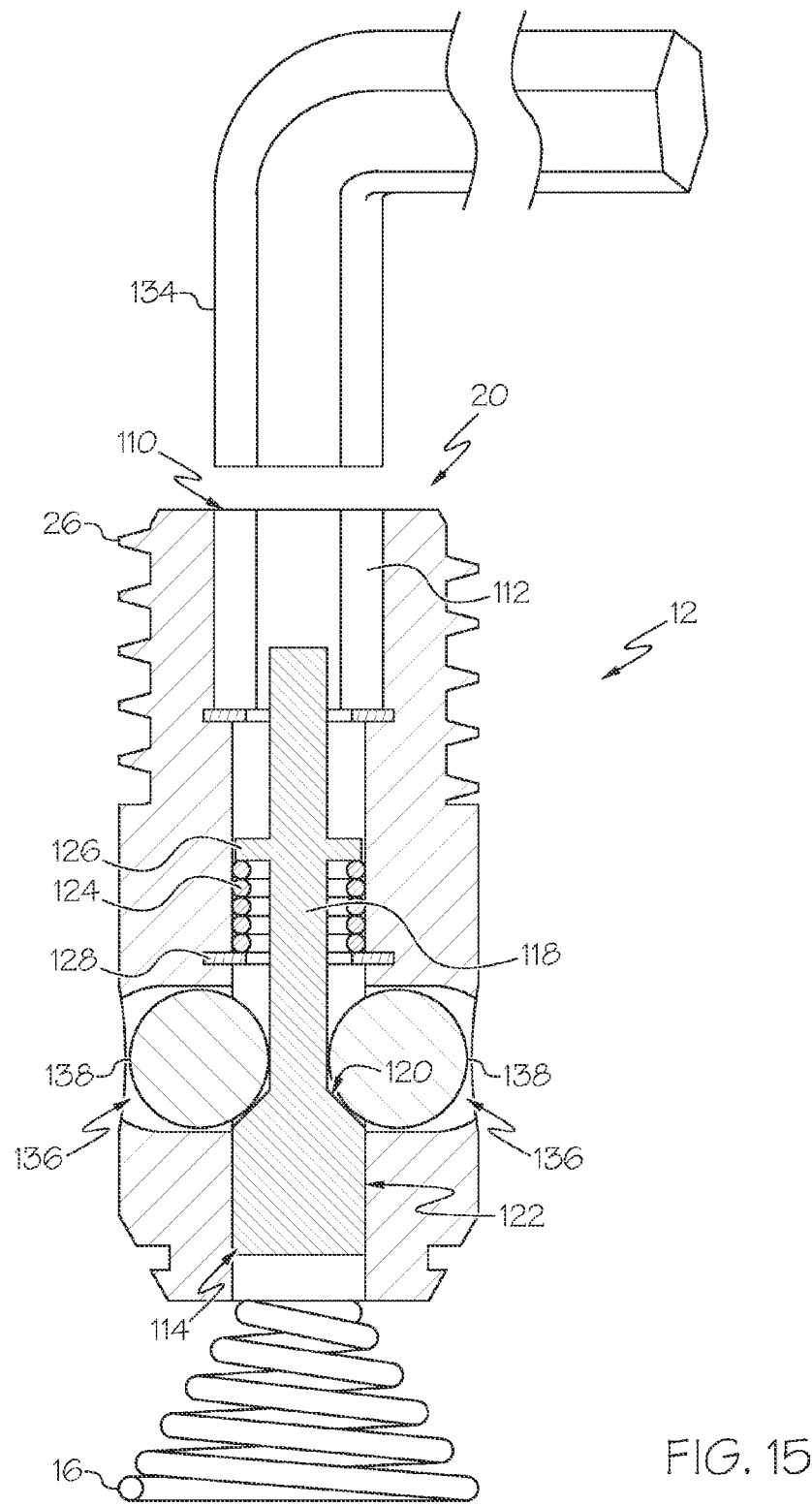
FIG. 15 is a cross-section view of the fastener of FIG. 13 in an unlocked position, according to various aspects of the present invention.

Referring to FIG. 15, the fastener is illustrated in an unlocked position. As illustrated, the pintle 114 has been axially repositioned relative to its position in FIG. 13, e.g., by using the Allen wrench 134 to push the pin 116 downward through the first socket 112. Particularly, the pintle 114 is positioned to a designated unlock position. In the designated unlock position, the ball locking surface 122 of the pintle 114 is moved axially away from each ball lock aperture 136. As illustrated, a narrowed portion of the rod 118 is now positioned generally in register with the ball lock apertures 136. As such, due to the gap between the narrowed portion of the rod 118 and the bore 110, the locking balls 138 are allowed to fully retreat into the housing in a manner analogous to the corresponding parts in FIG. 10 through FIG. 12.

When transitioning the fastener from the designated unlocked position to the designated locked position, such as by releasing pressure on the pin 116, the bias of the internal spring 124 transitions the ball transitioning surface 120 towards the ball lock apertures 136, providing a ramp that directs the locking balls 138 to drive up into their respective ball lock aperture 136. After ramping the locking balls 138 into their ball lock aperture 136, the internal spring 124 urges the ball locking surface 122 against the locking balls 138 thus locking the locking balls into their extended position.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:
1. A fastener for temporarily securing objects, comprising:
a housing having:
   a first end face;
   a second end face;
   a shaft extending between the first end face and the second end face;
   a central bore that extends axially at least partially through the housing from the first end face; and
   at least one ball lock aperture extending from the bore radially out through the shaft of the housing;
a pintle positioned within the bore, the pintle having:
   an actuation end;
   a rod that extends axially through the bore from the actuation end, the rod having:
   a ball transitioning surface; and
   a ball locking surface adjacent to the ball transitioning surface;
wherein:
   the pintle is moveable axially within the bore of the housing such that:
     in a designated lock position, the ball locking surface of the pintle is aligned in register with each ball lock aperture; and in a designated unlocked position, the ball lock surface of the pintle is moved axially away from each ball lock aperture;

a locking ball for each ball lock aperture, each locking ball having a diameter larger than the diameter of the associated ball lock aperture; and an external spring extending from the second end face of the housing.

2. The fastener according to claim 1 wherein the ball locking surface is dimensioned relative to the bore so as to position the first ball so as to extend radially out from the housing through the ball lock aperture when the pintle is in the lock position.

3. The fastener according to claim 1 wherein a portion of the rod of the pintle is aligned in register with each ball lock aperture when the pintle is in the unlock position such that the locking ball can recess into the housing of the fastener.

4. The fastener according to claim 1, further comprising a first socket extending into the fastener adjacent to the first end face, the first socket configured such that rotation of the first socket rotates the fastener.

5. The fastener according to claim 4 wherein:
the first socket comprises a base and a hole in the base;
the bore includes internal threads along at least a portion thereof;
the pintle includes an externally threaded portion that engages the internal threads of the bore; and
the pintle includes a second socket at an end proximate to the first socket, such that insertion of a tool through the hole in the first socket and into the second socket and rotation of the second socket relative to the first socket rotates the threaded portion of the pintle thus causing the pintle to axially traverse the bore to transition the pintle between the lock and unlock positions.

6. A fastener system for temporarily securing objects, comprising:
a fastener comprising:
a housing having:
a first end face;
a second end face;
a shaft extending between the first end face and the second end face;
a central bore that extends axially at least partially through the housing from the first end face; and
at least one ball lock aperture extending from the bore radially out through the shaft of the housing;
a pintle positioned within the bore, the pintle having:
an actuation end;
a rod that extends axially through the bore from the actuation end, the rod having:
a ball transitioning surface; and
a ball locking surface adjacent to the ball transitioning surface;
wherein:
the pintle is moveable axially within the bore of the housing such that:

in a designated lock position, the ball locking surface of the pintle is aligned in register with each ball lock aperture; and in a designated unlocked position, the ball lock surface of the pintle is moved axially away from each ball lock aperture; and a locking ball for each ball lock aperture, each locking ball having a diameter larger than the diameter of the associated ball lock aperture; and an external spring extending from the second end face of the housing; and a work holder having a fixture hole and a ball lock undercut coaxial with the fixture hole, wherein:

the diameter of the fixture hole allows the fastener to slide through when the pintle is moved to the designated unlocked position, and the locking ball engages the undercut of the work holder when the pintle is in the locked position.

7. The fastener according to claim 6 wherein the ball locking surface is dimensioned relative to the bore so as to position the first ball so as to extend radially out from the housing through the ball lock aperture when the pintle is in the lock position.

8. The fastener according to claim 6 wherein a portion of the rod of the pintle is aligned in register with each ball lock aperture when the pintle is in the unlock position such that the locking ball can recess into the housing of the fastener.

9. The fastener according to claim 6, further comprising a first socket extending into the fastener adjacent to the first end face, the first socket configured such that rotation of the first socket rotates the fastener.

10. The fastener according to claim 9 wherein:
the first socket comprises a base and a hole in the base;
the bore includes internal threads along at least a portion thereof;
the pintle includes an externally threaded portion that engages the internal threads of the bore; and
the pintle includes a second socket at an end proximate to the first socket, such that insertion of a tool through the hole in the first socket and into the second socket and rotation of the too rotates the threaded portion of the pintle thus causing the pintle to axially traverse the bore to transition the pintle between the lock and unlock positions.

11. The fastener according to claim 10 wherein the socket dimension of the second socket is smaller than the socket dimension of the first socket.

12. The fastener according to claim 6 wherein the work holder further comprises:
a first transition below the ball lock undercut having a diameter smaller than that of the ball lock undercut; and
a fastener storage undercut coaxially aligned with and underneath the first transition.

* * * * *